United States Patent [19]
Williams

[11] 4,080,229
[45] Mar. 21, 1978

[54] MANIPULATION OF SHEET MATERIAL WITH RECIPROCATING HEAD MACHINES

[75] Inventor: Dennis M. Williams, Clinton, Mass.

[73] Assignee: Nylon Products Corporation, Clinton, Mass.

[21] Appl. No.: 790,853

[22] Filed: Apr. 25, 1977

[51] Int. Cl.² .............................................. B32B 31/20
[52] U.S. Cl. .................... 156/73.1; 156/543; 156/580.1; 228/110; 228/1 R; 264/23
[58] Field of Search ...................... 156/73.1, 543, 538, 156/555, 580.1; 228/1 R, 110; 264/23

[56] References Cited
U.S. PATENT DOCUMENTS

| | | | |
|---|---|---|---|
| 3,679,526 | 7/1972 | Horton | 228/1 |
| 3,687,787 | 8/1972 | Grand | 156/543 |
| 3,761,038 | 4/1973 | Stauffer | 156/543 |

*Primary Examiner*—Edward G. Whitby
*Attorney, Agent, or Firm*—George E. Kersey

[57] ABSTRACT

Method and apparatus for the manipulation of sheet materials with reciprocating head machines. Each sheet of the material is mounted on a transport mechanism and controllably advanced relative to a reciprocating head. For each such advance, the sheet is pivoted by the transport mechanism into the path of the reciprocating head just before the engagement of the latter with a work piece. This permits precision control over the contact of the head with the material without disturbing the work piece.

9 Claims, 6 Drawing Figures

MANIPULATION OF SHEET MATERIAL WITH RECIPROCATING HEAD MACHINES

BACKGROUND OF THE INVENTION

This invention relates to the use of sheet materials with reciprocating head machines, particularly in ultrasonic welding.

In many industrial processes sheets of materials are used with reciprocating head machines, for example, those in which a head moves along a prescribed path into and out of engagement with one or more work pieces.

Thus, in ultrasonic welding a movable head or "horn" is moved into translational engagement with work pieces which are joined together by virtue of the vibratory energy transmitted from the horn to the parts. The vibratory energy is termed "ultrasonic" because it is either at the high end or beyond the audible sound spectrum.

For many materials, the contact of the horn with the work pieces can produce an undesirable marking. The marking is particularly objectionable where parts are being welded to produce a finished product. Even where the marking is easily removed, it is objectionable because of the need for an additional cleaning operation before the ultrasonically welded parts are ready for shipment.

It has been discovered that the marking of ultrasonically welded parts can be avoided by the interposition of a thin sheet or film of polyethelene between the parts being welded and the head. The film, which is on the order one to ten mills in thickness serves as a cushion for the head and avoids marking the parts. In one technique for using such a film to avoid marking, the operator manually positions the sheet of polyethelene between the welding head and the part before the head is brought into welding engagement. This procedure not only is subject to erratic operator manipulation, it also is accompanied by operator fatigue and it makes inefficient use of the cushioning material.

Accordingly, it is an object of the invention to facilitate the use of sheets of material with work being processed. A related object is to facilitate the use of thin sheets of material with reciprocating head machines. Another related object is to facilitate the use of thin sheets of material in ultrasonic welding and hot stamp processing.

Another object of the invention is to avoid interference with work pieces by thin sheets of material used in conjunction with reciprocating head machines. A related object is to avoid work piece interference by thin sheets of material in ultrasonic welding and hot stamp processing.

Still another object of the invention is to limit operator fatigue and interference with the operator work area in the use of thin sheets of material with respect to a work piece. A related object is to avoid operator fatigue and work area interference by thin sheets of material in ultrasonic welding, as well as in hot stamp processing.

SUMMARY OF THE INVENTION

In accomplishing the foregoing and related objects, the invention provides for the manipulation of a sheet of material with respect to a movable head by mounting the sheet on a transport mechanism which can be pivoted to position a selected portion of the sheet in the path of the head. After the head has engaged the sheet, the transport mechanism is retracted and the sheet advanced to enable a fresh portion of the sheet to be positioned beneath the head on the next cycle of operation.

In accordance with one aspect of the invention, the axis of pivot of the transport mechanism is offset from the axis of movement of the head. This provides precision control over the sheet with respect to the head and permits the sheet to be moved into position without adverse interference with the work in process.

In the case of a movable head for ultrasonic welding, the offset of the transport mechanism permits a thin sheet of cushioning material to be interposed beween the head and the part being worked without incurring the danger of knocking the part from position. This permits the ultrasonic welding, without marking, of delicate parts that require precise positioning with respect to one another. In the case of hot stamping the offset positioning permits a thin sheet of material to be brought into contact with a work piece without having the sheet dragged across the piece and causing possible interference and smear.

In accordance with further aspect of the invention, the pivot position of the transport mechanism is separate from the head. This prevents undesired loading of the head by the transport mechanism.

In accordance with a further aspect of the invention, the transport mechanism includes a drive shaft with both an internal and an external clutch to provide precision control over the advance of the of the sheet at the end of each cycle of operation. In addition the use of internal and external clutches permits the transport mechanism to be realized in a compact fashion that facilitates both its placement and its operation with respect to the movable head in order to lessen the likelihood of interference with the work being processed by the head.

DESCRIPTION OF THE DRAWINGS

Other aspects of the invention will become apparent after considering several illustrative embodiments, taken in conjunction with the drawings in which.

DETAILED DESCRIPTION

Figure 1A:
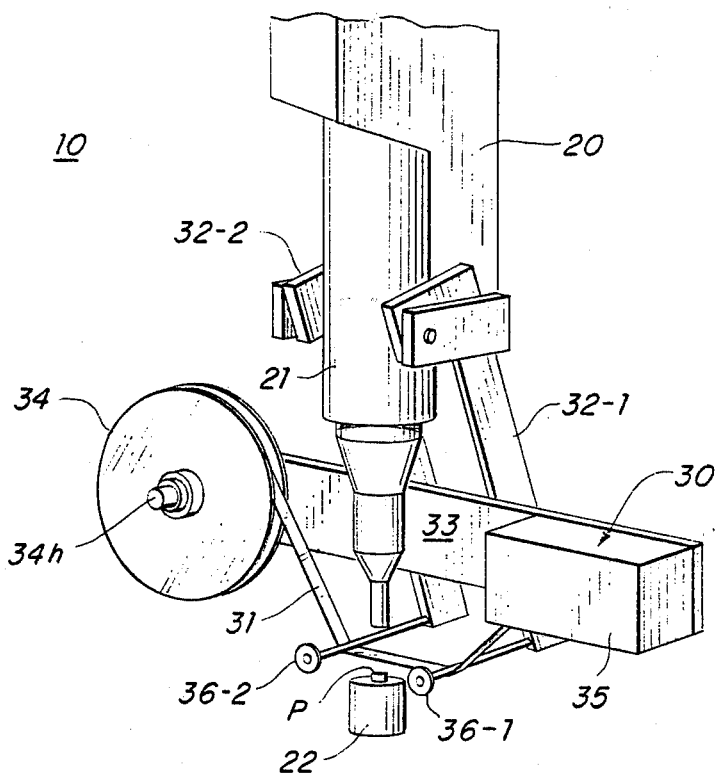
FIG. 1A is a perspective view of a system in accordance with the invention preparatory to being used for manipulating sheet material in ultrasonic welding.

Turning to the drawings, FIG. 1A shows a system 10 for the manipulation of sheet material with a reciprocating head machine, in accordance with the invention. The particular reciprocating head machine of FIG. 1A is an ultrasonic welder 20.

The welder 20 of FIG. 1A has a movable head or horn 21 which transmit high frequency mechanical energy to a joint area of parts which are to be welded together. The unit 20 illustratively delivers on the order of 4,000 watts to a converter at 20,000 hertz. This relatively high power permits easy and rapid welding of large parts; it also facilitates the welding of parts with a substantial filler content where appreciable energy is needed at the joint area. The relatively low ultrasonic frequency of 20,000 hertz enables horns as large as 7 by 12 inches to be used for a broad range of parts. The horn can be changed according to the nature of the parts being welded.

In production welding, an operator illustratively places parts P in a nest 22 mounted on a sliding fixture 23. When appropriate control buttons are pressed, a pneumatic fixture positions the parts P under the horn 21. Further operation then causes the horn 21 to contact the parts P, for example, for a six second weld time and a two second hold time.

Ordinarily the contact of the horn 21 with the parts P can produce a discoloration or even damage in the parts in those regions where there are discontinuities. Such discolorations and damage are avoided by the use of a cushioning polyethylene sheet between the parts P and the ultrasonic horn 21. This typically involves the manual placement of the sheet by the operator, with little control or consistency in the placement of the sheet from one cycle to another.

Figure 1B:
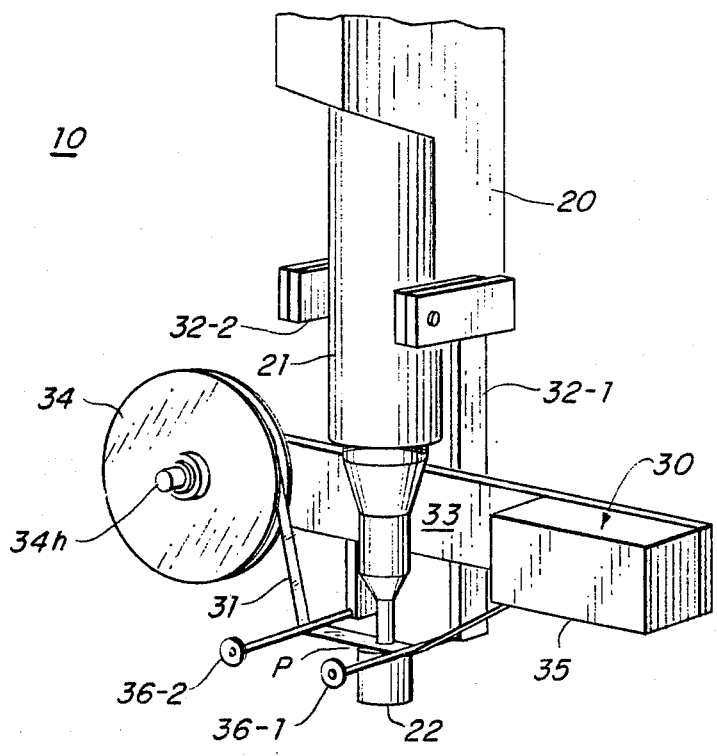
FIG. 1B is a perspective view of a portion of the system of FIG. 1A during operation in connection with ultrasonic welding.

In order to controllably provide a cushioning film, at the appropriate instant, between the horn 21 and the parts P being welded, the invention makes use of the pivotable transport assemblage 30 shown in retracted position in FIG. 1A and in operating position in FIG. 1B. The transport assemblage 30 is used to feed a thin strip 31 of material, for example polyethylene where ultrasonic marking of parts and damage are to be avoided between the head 21 and the parts P.

The transport mechanism 30 is formed by a frame with legs 32-1 and 2 that are pivotably attached to the stationary portion of the unit 20. The frame also includes a cross bar 33 that mounts a supply reel 34 on a hub 34h near one end and an advance mechanism 35 near the other end. The thin strip 31 of material is fed from the supply reel 34 over guide pins 36-1 and 36-2 to the advance mechanism 35.

Figure 2A:
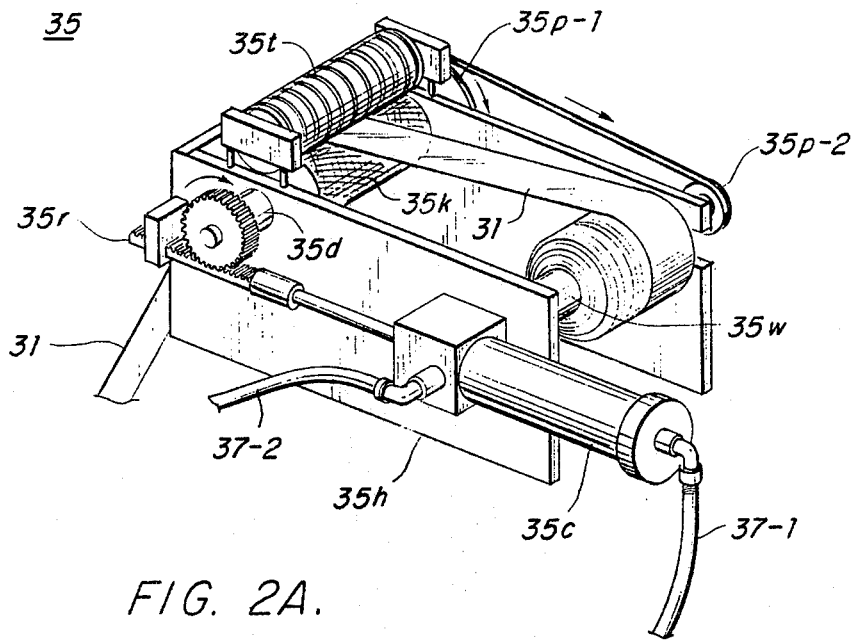
FIG. 2A is a perspective view from the front showing details of the transport mechanism portion of the system of FIGS. 1A and 1B.

The advance mechanism 35, shown in detail in FIG. 2A, includes a housing 35h with a drive shaft 35d that is operated by a rack 35r in order to rotate a knurled knob 35k and advance the strip 31 between the knurled surface of the knob 35k and a tensioning roller 35t formed by individual "O" rings in side to side placement. The strip 31 is then wound on a take-up reel 35w which operates from the drive shaft 35d through a drive pulley 35p-1 that transmits the motion through a belt 35b to a driven pulley 35p-2.

Figure 2B:
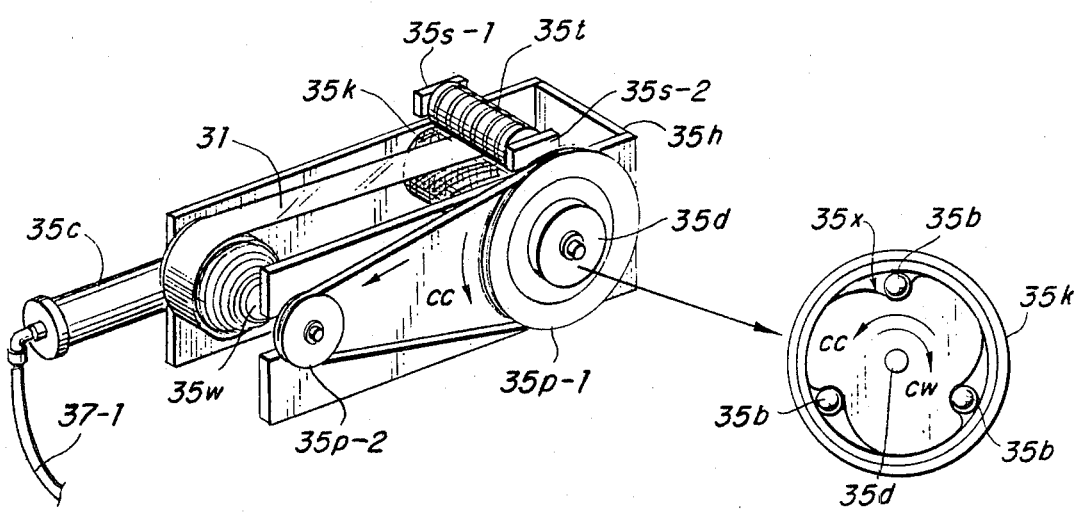
FIG. 2B is a perspective view from the rear of the transport mechanism of FIG. 2A with a breakaway portion to illustrate a type of clutch used with the drive shaft.

The drive of the advance mechanism 35 is further illustrated in the rear view of FIG. 2B. As indicated, the drive shaft 35d includes a roller clutch 35x so that counterclockwise rotation CC in FIG. 2B allows the shaft to turn freely with respect to the knurled cylinder 35k. However clockwise rotation CW causes the roller balls 35b of the clutch 35x to become wedged between the drive shaft 35d and the interior wall of the knurled cylinder 35k, causing the clockwise rotation of the drive shaft 35d to be transmitted to the cylinder 35k, which in turn rotates. In addition to the internal clutch between the drive wheel 35d and the knurled wheel 35k there is an external drive clutch (not shown) between the drive shaft 35d and the drive pulley 35p-1.

The motion for the operation of the drive shaft 35d is derived from the rack 35r which is in turn connected to a pneumatic cylinder 35c. Fluid for operating the cylinder 35c is supplied to a line 37-1 or 37-2 according to whether the drive shaft 35d is to be rotated in its clockwise or counterclockwise direction.

Additionally shown in FIG. 2B are the supports 35s-1 and 35s-2 for the tensioning roller 35t. The use of separate supports permits precision control over the amount of tension applied to the strip 31 by the roller 35t with respect to the knurled cylinder 35k.

Figure 3A:
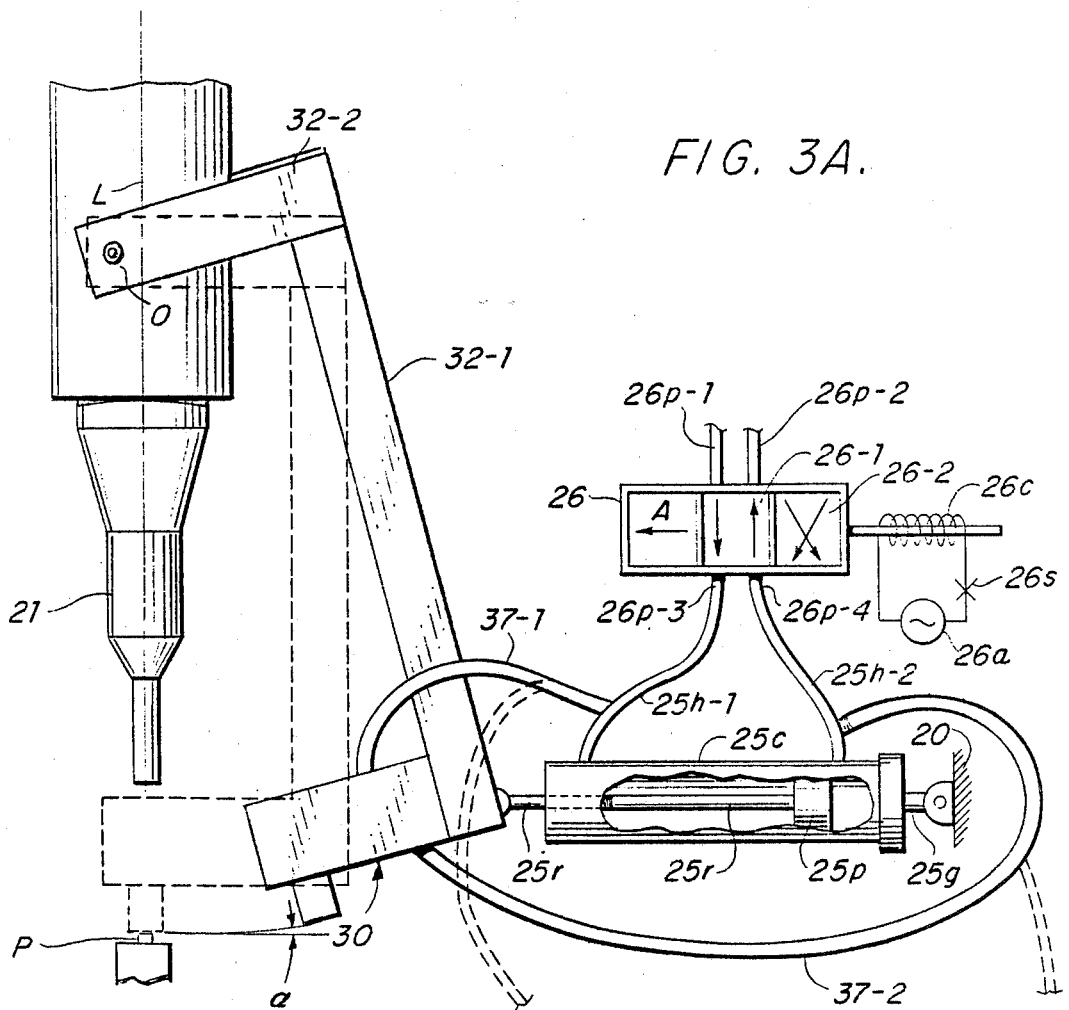
FIG. 3A is a schematic view illustrating the operation of the system of FIG. 1A in manipulating a sheet of material in ultrasonic welding.
Figure 3B:
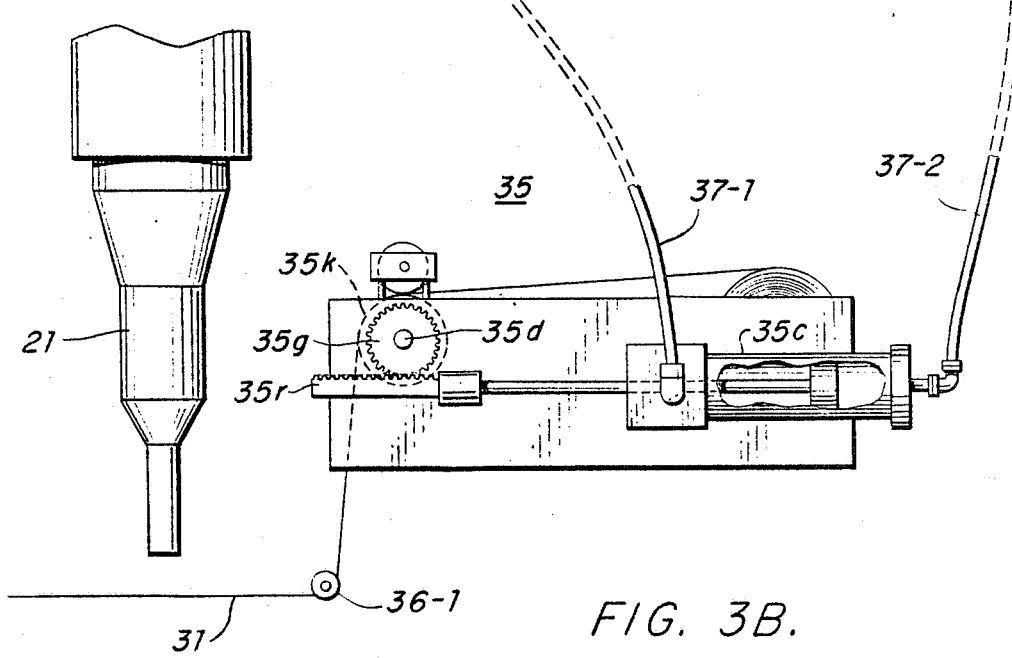
FIG. 3B is a schematic view providing a further illustration of the operation of the transport mechanism portion of the system of FIG. 3A.

The operation of the system is illustrated schematically in FIGS. 3A and 3B. As shown in FIG. 3A the transport assemblage 30 is pivotally mounted by its arms 32-1 and 32-2 so that the center of pivot O is offset from the center line L of motion for the horn 21. As a result the arc made by the assemblage 30 forms a comparatively small angle α with respect to the work piece P. Because of the shallow angle α there is a reduced likelihood that the swinging motion of the assemblage 30 will strike or dislodge the work piece P.

The motion of the assemblage 30 is controlled by a pneumatic cylinder 25c, which has a rod 25r pivotally connected to the mechanism 30 and a housing 25g pivotally connected to the unit 20. Operation of the cylinder is through a solenoid control 26. The control 26 has four ports 26p-1 through 26p-4. One of the ports 26p-1 is for the entry of the operating fluid, which is illustratively air. The companion port 26p-2 is for exhaust on the side of the piston 25p where air is being displaced. The other ports 26p-3 and 26p-4 are connected to hoses 25h-1 and 25h-2.

The solenoid control 26 is illustrated as being operated from an alternating current source 26a by a coil 26c through a switch 26s. When the switch 26s is open, air passes through the control block 26-1 into the line 25h-1 and into the cylinder 25, maintaining the piston 25p in its most retracted position. Any resistance to the reaction is eliminated by venting through the line 25h-2. When the switch 26s is closed, the coil 26c is energized, forcing the internal control block in the direction indicated by the arrow A, so that the incoming air pressure is reversed by control block 26-2 over the line 25h-2 to the piston end of the cylinder 25c. This forces the rod 25r outwardly to the position indicated in phantom, causing the assemblage 30 to be positioned with the tape 31 between the head 21 and the work P.

The simultaneous effect on the advance mechanism 35 is illustrated in FIG. 3B. When the internal control block 26-1 of the control 26c is operative, air pressure on the line 35p-1 maintains the piston of the cylinder 35c in its retracted position. Conversely, when the solenoid 26c is actuated and the control block 26-2 is operative, the air pressure changes direction so that positive pressure is applied to the line 35p-2, forcing the piston of the cylinder 35c outwardly.

However, the outward motion does not bring about a rotation of the knurled cylinder 35k (FIGS. 2A and 2B) or of the drive pulley 35p-1, because of the clutch mechanisms discussed above. On the other hand, when the assemblage 30 is retracted and the direction of positive pressure is reversed, causing the piston of the cylinder 35c in FIG. 3B to be retracted, this brings about engagement of the clutch and rotation of both the knurled cylinder 35k and the drive pulley 35p-1. Consequently, the retraction of the assemblage 30 is combined with the simultaneous operation of the mechanism 35 to advance the strip 31 to a new position for use in the ensuing cycle of operation of the horn 21. The switch 26s of FIG. 3A which controls the operation of the valve 26c is desirably connected to the unit 20 to be open during the downward motion of the horn 21 and closed during upward motion of the horn 21.

As noted above, the drive shaft 35d of FIGS. 2A and 2B has both an internal and an external clutch which operate to provide proper take-up as the shaft 35d rocks back and forth during operation.

While it would be possible to avoid the need for two clutches, by having a clutch in the pinion drive gear 35g, this would add to the bulk and complexity of the unit. If a clutch is included in the gear 35g, it would be necessary to provide a special house. This would increase the size of the take-up mechanism and require front side support. In addition, it is possible to get longer life from the bearings by using two clutches instead of the single clutch in the gear 35g.

The air cylinders 35c and 25c illustratively are of the type manufactured by the Bimba Company under the model designation BF-04. Air cylinders of this type have a front block mounting and have a stainless steel rod.

The internal and external clutches used in the drive shaft 35d illustratively are of the drawn cup roller type manufactured by the Torrington Company of Torrington, Connecticut. This clutch action results from the particular way roller bearings are positioned in a roller cup. When the clutch is engaged, the rollers are positioned by a retainer spring and advanced into locked positions on ramps causing the entire unit to rotate with the shaft. When the clutch is overrunning the housing rotates faster than the shaft and the rollers disengage, permitting low friction overrunning.

The ultrasonic welder 20 is illustratively an ultrasonic plastic assembly unit sold and marketed under the designation "Branson 700".

While various aspects of the invention have been set forth by the drawings and specification, it is to be understood that the foregoing detailed description is for illustration only and that various changes in parts, as well as the substitution of equivalent constituents for those shown and described may be made without departing from the spirit and scope of the invention as set forth in the appended claims.

What is claimed is:

1. The method of manipulating a sheet of material with respect to a reciprocating head which comprises the steps of:
   (a) positioning the sheet on a pivotally transport mechanism;
   (b) pivotally moving the transport mechanism to position the sheet beneath the head; and
   (c) engaging the sheet between the head and a work piece.

2. The method of claim 1 wherein said transport mechanism has an axis of pivot which is offset from the axis of movement of the head.

3. The method of claim 1 wherein said transport mechanism is moved into position as said head begins its downward stroke.

4. The method of claim 3 wherein said transport mechanism is moved out of position as said head begins its upward stroke.

5. The method of claim 1 wherein said head is used for ultrasonic welding.

6. The method of claim 1 wherein said head is used for hot stamp processing.

7. The method of claim 2 wherein said transport mechanism causes a selected portion of said sheet to be positioned in the path of said head.

8. The method of claim 7 wherein the positioning of said sheet is controlled by a drive shaft having a clutch mechanism.

9. The method of claim 8 wherein said drive shaft includes an internal and external clutch.

* * * * *